United States Patent
Laiho et al.

(10) Patent No.: US 7,799,435 B2
(45) Date of Patent: Sep. 21, 2010

(54) EXTRUSION COATING POLYETHYLENE

(75) Inventors: Erkki Laiho, Helsinki (FI); Markku Sainio, Porvoo (FI); Karoliina Haapaniemi, Linz (AT)

(73) Assignee: Borealis Technology Oy, Porvoo (FI)

( * ) Notice: Subject to any disclaimer, the term of this patent is extended or adjusted under 35 U.S.C. 154(b) by 117 days.

(21) Appl. No.: 10/522,451

(22) PCT Filed: Jan. 12, 2005

(86) PCT No.: PCT/EP2005/000221

§ 371 (c)(1),
(2), (4) Date: Feb. 11, 2008

(87) PCT Pub. No.: WO2006/074694

PCT Pub. Date: Jul. 20, 2006

(65) Prior Publication Data

US 2009/0004489 A1    Jan. 1, 2009

(51) Int. Cl.
    *B32B 27/00*    (2006.01)
(52) U.S. Cl. ........................ 428/461; 428/500
(58) Field of Classification Search ............ 428/461
    See application file for complete search history.

(56) References Cited

U.S. PATENT DOCUMENTS 4,978,572 A    12/1990  Akao
5,346,926 A *  9/1994  Sakamoto et al. ............. 521/81
5,770,540 A *  6/1998  Garoff et al. ................. 502/154
6,110,552 A *  8/2000  Casey et al. ................. 428/40.1
7,129,296 B2 * 10/2006  Van Dun et al. ............. 525/191
2003/0149162 A1* 8/2003  Ahlstrand .................... 524/495
2006/0014897 A1* 1/2006  Myhre et al. .................. 525/89
2006/0142495 A1* 6/2006  Laiho et al. .................. 525/240

FOREIGN PATENT DOCUMENTS

| EP | 0 688 794 | 8/1998 |
| WO | WO 92/12181 | 7/1992 |
| WO | WO 96/18662 | 6/1996 |
| WO | WO 97/22633 | 6/1997 |
| WO | WO 00/34580 | 6/2000 |
| WO | WO 00/71615 | 11/2000 |

* cited by examiner

*Primary Examiner*—Ling-Siu Choi
*Assistant Examiner*—Hui Chin
(74) *Attorney, Agent, or Firm*—Milbank, Tweed, Hadley & McCloy, LLP

(57) ABSTRACT

The present invention relates to a polymer composition with good chemical properties and barrier properties being multimodal and comprising a polymer (A) having a weight average molecular weight of lower than 6000 g/mol and a polyolefine (B) having a higher weight average molecular weight than polymer (A) and a filler (C), whereby a polymer composition without filter (C) has a density of 940 kg/m$^3$ or lower.

42 Claims, No Drawings

EXTRUSION COATING POLYETHYLENE

The present invention relates to a polymer composition suitable for extrusion coating and films, preferably cast films having good chemical properties and barrier properties, in particular, a low water-vapor transmission rate (WVTR) and a low curling. Additionally, the present invention relates to the process for producing the inventive composition and its use. Moreover, the present invention is related to a multi-layer material comprising the polymer composition as well as to a process of said multi-layer material.

One of the largest and most rapidly growing polyolefin-processing method is extrusion coating. The largest single volume of coated materials are different papers and paperboards, which are used for a variety of packaging applications. Other material frequently coated are polymer films, cellophane, aluminium foil, freezer wrap paper and fabrics of various kinds. One target for the improvement of coated articles is to reduce the water-vapor transmission rate (WVTR) as much as possible. A coated material with a low water-vapor transmission rate (WVTR) can for example protect the products wrapped therein much better. The demanded requirement applies, of course, not only to coated materials but also to cast films used for packaging or containers. In both cases, a low water-vapor transmission rate is required. Much effort has been undertaken to improve the water-vapor transmission rate of coated materials as well as for cast films. To date, several new polymer compositions have been developed and much effort has been undertaken to find appropriate fillers to improve the barrier properties significantly. Furthermore, different polymers have been designed as cyclo-olefin copolymers (COC) and liquid crystal polymers (LCP). However, these materials have the drawback of being expansive and having minor processability properties.

WO 00/71615 discloses for example the use of a bimodal high density polyethylene (HDPE) with a melt flow rate, $MFR_2$, of 5 g/10 min and a density of 957 kg/m$^3$ for extrusion coating. No information is given how to improve the water-vapor transmission rate (WVTR).

WO 00/34580 describes release liner for pressure-sensitive adhesive labels. The release-liner contains a paper wrap, a filled polymer layer, and, on the opposite of the paper web, an extrudate, e.g. polyethylene, and on the top of the extrudate, a release film. The filled polymer layer can be polyethylene and the filler is an inert particulate, such as silica, mica, clay, talc and titanium oxide. The filler is present in 15 to 40 wt % of the composition.

U.S. Pat. No. 4,978,572 describes a laminated film having three layers. The first layer comprises a thermoplastic resin and 0.3 to 30 wt % white inorganic particles. The second one comprises an ethylene copolymer, 0.5 to 90 wt % of a substance giving anti-block action and anti-oxidant. The third one comprises a metallized thermoplastic. The substance giving anti-block action of the second layer may be silica or talc. The laminated film is reported to have good mechanical strength and good barrier properties.

Even though the prior art offers already a variety of products having good water-vapor transmission rates (WVTR), there is still demand for a significant improvement of these properties. One significant disadvantage in polymer compositions comprising fillers reducing the water-vapor transmission rate (WVTR) is the low dispersion of the fillers incorporated in the polymer matrix. Conventional mechanical incorporation frequently results in poor dispersion as usual fillers form multi-layer aggregation caused by incompatibility with polymer matrix. One consequence of the described phenomenon is that the water-vapor transmission rate (WVTR) varies considerably in the layer leading to unsatisfying average values for the WVTR. Secondly, the low dispersion of the filler causes an easy upcurling of the polymer composition coated on the materials. Hence, a uniform dispersion of fillers incorporated in a polymer composition should improve the water-vapor transmission rate significantly, and, additionally, the curling properties of a coated material should be enhanced.

Hence, the object of the present invention is to improve the water-vapor transmission rate (WVTR).

The present invention is based on the finding that the object can be addressed by a polymer composition comprising a polymer having a low average molecular weight enabling an enhanced and uniform dispersion of fillers incorporated in the polymer composition.

The present invention therefore provides a multimodal polymer composition comprising
a) at least one polymer (A) having a weight average molecular weight ($M_w$) of lower than 60,000 g/mol;
b) at least one polyolefin (B) having a higher weight average molecular weight ($M_w$) than polymer (A); and
c) a filler (C) whereby the polymer composition without filler (C) has a density of 940 kg/m$^3$ or lower.

It is preferred that the polymer composition consists of
a) at least one polymer (A) having a weight average molecular weight ($M_w$) of lower than 60,000 g/mol;
b) at least one polyolefin (B) having a higher weight average molecular weight ($M_w$) than polymer (A); and
c) a filler (C) whereby the polymer composition without filler (C) has a density of 940 kg/m$^3$ or lower.

Accordingly the polymer composition according to this invention is multimodal with respect to the molecular weight distribution. "Multi-modal" or "multimodal distribution" describes a frequency distribution that has several relative maxima. In particular, the expression "modality of a polymer" refers to the form of its molecular weight distribution (MWD) curve, i.e. the appearance of the graph of the polymer weight fraction as a function of its molecular weight. The molecular weight distribution (MWD) of a polymer produced in a single polymerization stage using a single monomer mixture, a single polymerization catalyst and a single set of process conditions (i.e. temperature, pressure, etc.) shows a single maximum the breadth of which depends on catalyst choice, reactor choice, process conditions, etc., i.e. such a polymer is monomodal.

This inventive composition is characterized by a very low water-vapor transmission rate (WVTR) and also by low curling-values for extrusion-coated layers. These improved properties are reached by a much better dispersion of the filler (C) in the polymer mixture of polymer (A) and polyolefin (B) compared with an unmimodal polymer having the same melt index and density for both extrusion-coated layers and cast films.

Hence, the polymer composition according to this invention is a multimodal including bimodal polymer composition consisting of at least two different polymers having two different molecular weight distribution curves and are blended mechanically or in situ during the preparation thereof. Preferably the polymer composition is at least a bimodal mechanical or in-situ blend of a polyolefin (1) (as polymer (A)) and polymer (B). In case such a bimodal blend comprises further a wax (2) as an additional polymer (A), then the final polymer composition may also be trimodal.

The molecular weight distribution (MWD) is the relation between the numbers or molecules in a polymer and their individual chain length. The molecular weight distribution (MWD) is often given as a number, which normally means weight average molecular weight ($M_w$) divided by number average molecular weight ($M_n$).

The weight average molecular weight ($M_w$) is the first moment of a plot of the weight of polymers in each molecular weight range against molecular weight. In turn, the number average molecular weight ($M_n$) is an average molecular weight of a polymer expressed as the first moment of a plot of the number of molecules in each molecular weight range against the molecular weight. In effect, this is the total molecular weight of all molecules divided by the number of molecules.

The number average molecular weight ($M_n$) and the weight average molecular weight ($M_w$) as well as the molecular weight distribution (MWD) are determined according to ISO 16014.

The weight average molecular weight ($M_w$) is a parameter for the length of the molecules in average. Low $M_w$-values indicate that the chain length of the molecules is rather short in average. It has been found out that a polymer mixture comprising a polymer (A) with $M_w$-values of lower than 60,000 g/mol contributes inter alia to better barrier properties and better dispersion of the filler (C). Such better dispersion improves the water-vapor transmission rate (WVTR) as well as the curling resistance positively.

Hence, as a further requirement of the present invention, the multimodal polymer composition must comprise at least one polymer (A) having a weight average molecular weight ($M_w$) of lower than 60,000 g/mol. It is in particular preferred that at least one polymer (A) having a weight average molecular weight ($M_w$) of lower than 60,000 g/mol is at least one polyolefin (1) having a weight average molecular weight ($M_w$) of 10,000 to 60,000 g/mol, more preferably of 20,000 to 50,000 g/mol and/or at least one wax (2) having a weight average molecular weight ($M_w$) of less than 10,000 g/mol, more preferably in the range of 500 to 10,000 g/mol.

Moreover, it is preferred that the polyolefin (1) is a polyethylene or polypropylene, more preferably a polyethylene. The polyolefin (1) can be a homopolymer or copolymer. It is preferred that the polyolefin (1) is a homopolymer or copolymer of propylene or ethylene, more preferred the polyolefin (1) is a homopolymer or copolymer of ethylene. Most preferably the polyolefin (1) is a low density polyethylene (LDPE), a linear low density polyethylene (LLDPE), or a linear medium density polyethylene (LMDPE). LDPE, LLDPE and LMDPE are equally suitable alternatives for polyolefin (1), e.g. where a LLDPE or a LMDPE is applicable also a LDPE can used and vice versa.

In case polymer (A) is a wax (2), it is preferred that it is selected from one or more of (2a) a polypropylene wax having a weight average molecular weight ($M_w$) of less than 10,000 g/mol, more preferably in the range of 500 to 10,000 g/mol, still more preferably in the range of 1000 to 9000 g/mol, yet more preferably in the range of 2000 to 8000 g/mol and most preferably in the range of 4000 to 8000 g/mol or a polyethylene wax having a weight average molecular weight ($M_w$) of less than 10,000 g/mol, more preferably in the range of 500 to 10,000 g/mol, still more preferably in the range of 1000 to 9000 g/mol, yet more preferably in the range of 2000 to 8000 g/mol and most preferably in the range of 4000 to 8000 g/mol, and (2b) an alkyl ketene dimer wax having weight average molecular weight ($M_w$) of less than 10,000 g/mol, more preferably lower than 5000 g/mol, yet more preferably lower than 1000 g/mol. In turn the alkyl ketene dimer wax has preferably weight average molecular weight ($M_w$) of at least 100 g/mol. Most preferred the alkyl ketene dimer wax has weight average molecular weight ($M_w$) in the range of 250 to 1000 g/mol.

The terms "at least one polymer (A)", "at least one polyolefin (1)" or "at least one wax (2)" shall indicate that more than one polymer (A), polyolefin (1) or wax (2) can be present in the multimodal polymer composition. It is preferred that three, two or one different polymers (A) as defined above are used in a multimodal polymer composition. Still more preferred is that wax (2), preferably a polypropylene wax (2a) or an alkyl ketene dimer wax (2b) as defined above is used as a component (A) only. In case the component (A) comprises a polyolefin (1) as defined above, it is preferred that a wax (2) is present in the multimodal polymer composition as a further polymer (A). In such cases the multimodal composition is preferably trimodal comprising polyolefin (1), wax (2) and polyolefin (B) having different centered maxima in their molecular weight distribution, e.g. having different weight average molecular weights ($M_w$). The use of the wax (2) has the benefit that the amorphous region of the polymer matrix, which may be a mix of polyolefin (1) and polyolefin (B), is filled up and improves thereby the barrier properties.

It is preferred that not only the final polymer composition has a specific density of 940 kg/m$^3$ or lower but also the polymer (A) shall have a density of lower than 945 kg/m$^3$. It is preferred that polyolefin (1) when used as polymer (A) has a density lower than 945 kg/m$^3$, more preferably is in a range of 905 to 935 kg/m$^3$, still more preferably in the range of 910 to 930 kg/m$^3$ and most preferred in the range of 915 to 925 kg/m$^3$. Preferably, the polyolefin (1) is a linear low density polyethylene (LLDPE) or a linear medium density polyethylene (LMDPE). In turn, also a low density polyethylene (LDPE) produced in a high pressure process by free radical polymerization is applicable as a polyolefin (1). The linear low density polyethylene (LLDPE) or the linear medium density polyethylene (LMDPE) is produced by a process as described for the polyolefin (B) below.

The molecular weight distribution (MWD) of the polymer composition is further characterized by the way of its melt flow rate (MFR) according to ISO 1133 at 190° C. The melt flow rate (MFR) mainly depends on the average molecular weight. The reason for this is that long molecules give the material a lower flow tendency than short molecules.

An increase in molecular weight means a decrease in the MFR-value. The melt flow rate (MFR) is measured in g/10 min of the polymer discharged under specific temperature and pressure conditions and is the measure of a viscosity of the polymer which in turn for each type of polymer is mainly influenced by its molecular weight distribution, but also by its degree of branching. The melt flow rate measured under a load of 2.16 kg (ISO 1133) is denoted as $MFR_2$. In turn, the melt flow rate measured with 5 kg load (ISO 1133) is denoted as $MFR_5$.

In case polymer (A) is a polyolefin (1), it is preferred that $MFR_2$ is in the range of 1.0 to 20.0 g/10 min and more preferably in the range of 2.0 to 15.0 g/10 min and for example in the range of 3.0 to 10.0 g/10 min. According to one embodiment, the polyolefin (1) is a linear low density polyethylene (LLDPE) or a linear medium density polyethylene (LMDPE) with $MFR_2$ as given above. In turn, polyolefin (1) can also be a low density polyethylene (LDPE) having a density in the range as stated in this paragraph. The low density polyethylene (LDPE) is produced in a high-pressure process by free radical polymerization. In turn, the linear low density polyethylene (LLDPE) or the linear medium density polyethylene (LMDPE) is produced as described for polyolefin (B).

In case polymer (A) is an ethylene homopolymer, it is preferred that the ethylene homopolymer contains less than 0.2 mol %, more preferably less than 0.1 mol % and most preferably less than 0.05 mol % units derived from alpha-olefins other than ethylene. It is in particular preferred that the polymer (A) is an ethylene copolymer, more preferably having a weight average molecular weight from 10,000 to 60,000 g/mol, still more preferably from 20,000 to 50,000 g/mol. Yet more preferably the polymer (A) is an ethylene copolymer having a density of 905 to 935 kg/m³, more preferably of 910 to 930 kg/m³, most preferably of 915 to 925 kg/m³ and having a melt index $MFR_2$ from 1.0 to 20.0 g/10 min, more preferably from 2.0 to 15.0 g/10 min, most preferably of 3.0 to 10.0 g/10 min. Preferably, the ethylene copolymer comprises, more preferably consists of, comonomer units as defined below for the LLDPE. It is in particular preferred that the ethylene copolymer fulfills all properties as stated above simultaneously.

In case polymer (A) is a wax (2a), namely a polypropylene wax or a polyethylene wax, it is preferred that the wax (2a) has a weight average molecular weight ($M_w$) in the range of 500 to 10,000 g/mol, more preferably in the range of 1,000 to 9,000 g/mol, still more preferably in the range of 2,000 to 8,000 g/mol and most preferably in the range of 4,000 to 8,000 g/mol. Further preferred ranges for the weight average molecular weight ($M_w$) of the wax (2a), in particular the polypropylene or polyethylene wax, is in the range of 4,000 to 7,000 g/mol, still more preferably in the range of 5,000 to 6,000 g/mol and most preferably in the range of 5,300 to 5,400 g/mol. Additionally, it is preferred that the wax (2a), in particular the polypropylene wax or polyethylene wax, has a z-average molecular weight of 9,100 to 40,000 g/mol, more preferably from 500 to 20,000 g/mol and most preferably from 10,000 to 12,000 g/mol. It is additionally preferred that the wax (2a), in particular the polypropylene wax or the polyethylene wax, has a number average molecular weight ($M_n$) of 100 to 20,000 g/mol, more preferably of 500 to 3,000 g/mol.

Moreover, it is preferred that wax (2a), in particular polypropylene wax or polyethylene wax, has a specific molecular weight distribution (MWD) which is the relation between the number of molecules in the polymer and their individual chain length. The molecular weight distribution is given as a number which means weight average molecular weight divided by number average molecular weight ($M_w/M_n$). It is preferred that the wax (2a), in particular the polypropylene wax or the polyethylene wax, has an MWD in the range of 1 to 5, more preferably in the range of 1.5 to 4.

In addition, it is preferred that the wax (2a), in particular the polypropylene wax or the polyethylene wax, has a melting temperature in DSC-analysis of below 150° C., more preferably below 140° C., still more preferably in the range of 95 to 130° C., most preferably in a range of 105 to 115° C.

In case a wax (2b), namely an alkyl-ketene dimer, is employed as polymer (A), it is preferred that the weight average molecular weight ($M_w$) of the wax (2b) is higher than 100 g/mol. In turn, it is preferred that the weight average molecular weight of the wax (2b) is lower than 10,000 g/mol, more preferably lower than 5,000 g/mol, still more preferably lower than 1,000 g/mol. Preferred ranges for the weight average molecular weight ($M_w$) of the wax (2b) is 100 to 10,000 g/mol, more preferably 250 to 1,000 g/mol. Additionally, it is preferred that the wax (2b) has a number average molecular weight ($M_n$) of 100 to 20,000 g/mol, more preferably in the range of 100 to 800 g/mol. In addition, it is preferred that wax (2b) has a melting temperature in DSC-analysis below 140° C., more preferably below 100° C. A preferred range for the melting temperature in DSC-analysis is 50 to 90° C., more preferably 50 to 70° C.

As a further requirement, according to the present invention, the polyolefin (B) shall have a higher weight average molecular weight ($M_w$) than polymer (A). It is preferred that the polyolefin (B) has a weight average molecular weight ($M_w$) of higher than 80,000 g/mol, more preferably higher than 100,000 g/mol. The upper limit for the weight average molecular weight for polyolefin (B) shall preferably not be higher than 300,000 g/mol, more preferably not higher than 200,000 g/mol. The preferred range for the weight average molecular weight for polyolefin (B) is 80,000 to 300,000 g/mol, more preferably from 100,000 to 200,000 g/mol. Preferably, polyolefin (B) is a linear low density polyethylene (LLDPE) or a linear medium density polyethylene (LMDPE), which has been preferably produced in a low medium pressure process in the presence of a polymerization catalyst (i.e. a Ziegler-Natta catalyst or a metallocene catalyst). A linear low density polyethylene (LLDPE) and a linear medium density polyethylene (LMDPE) has a density lower than 945 kg/m³, more preferably in the range of 905 to 935 kg/m³, still more preferably in the range of 910 to 930 kg/m³ and most preferred in the range of 915 to 925 kg/m³. However, also a low density polyethylene (LDPE) is also applicable for the polyolefin (B). A low density polyethylene (LDPE) has the same density ranges as the LLDPE or the LMDPE as stated in this paragraph and is a product from a high pressure polymerization process characterized by a highly branched chain structure. LDPE, LLDPE and LMDPE are equally suitable alternatives for polyolefin (B), e.g. where a LLDPE or a LMDPE is applicable also a LDPE can used and vice versa.

According to this invention, more than one polyolefin (B) can be used. Accordingly, the invention also comprises the possibility of any mixture of a linear low density polyethylene (LLDPE), a linear medium density polyethylene (LMDPE) and a low density polyethylene (LDPE).

The $MFR_2$ of the polyolefin (B) is preferably in the range of 1.0 to 20.0 g/10 min, more preferably in the range of 2.0 to 15.0 g/10 min, in the range of e.g. 3.0 to 10.0 g/10 min. It is in particular preferred that the linear low density polyethylene (LLDPE) and the linear medium density polyethylene (LMDPE) have such melt flow characteristics. In turn, also the low density polyethylene (LDPE) suitable as a polyolefin (B) may have the melt flow characteristics as given in this paragraph.

It is preferred that the polyolefin (B) is a polyethylene. In case the polyolefin (B) is a polyethylene, it may be an ethylene homopolymer or an ethylene copolymer. In case for the polyolefin (B) an ethylene homopolymer is employed, then preferably an ethylene homopolymer is used as defined for polymer (A). In case an ethylene copolymer is employed for polyolefin (B), then preferably an ethylene copolymer is used as defined below. It is in particular preferred that polyolefin (B) is a low density polyethylene (LDPE), a linear low density polyethylene (LLDPE) or a linear medium density polyethylene (LMDPE).

According to one embodiment, the polymer composition according to this invention is a linear low density polyethylene (LLDPE) comprising polyolefin (1) (polymer (A)) as a low molecular weight fraction of LLDPE and polyolefin (B) as a high molecular weight fraction of LLDPE. This linear low density polyethylene (LLDPE) may be a mechanical blend, preferably an in-situ blend produced in a multi-stage process. Preferably said composition comprises wax (2) as a further polymer (A).

It is preferred that the polymer composition as defined above comprises 1 to 50 wt % of polymer (A), 40 to 90 wt % of polyolefin (B) and 1 to 50 wt % of filler (C), more preferably of 5 to 40 wt %, and most preferably of 10 to 35 wt %. In case the polymer composition is produced in an in situ polymerization process, e.g. a sequential step process by utilizing reactors coupled in series and described as above, it is preferred that the polymer (A) may range from 40 to 60 wt %, more preferably 49 to 55 wt % in the polymer mix without filler (C). In turn, it is preferred that in such a polymer mix, the polyolefin (B) ranges from 60 to 40 wt %, more preferably from 51 to 45 wt %. Preferably, the total polymer composition comprises 50 to 99 wt % of said polymer mix and of 1 to 50 wt % filler (C), more preferably of 5 to 40 wt %, and most preferably of 10 to 35 wt %.

In case polymer (A) and polyolefin (B) are blended mechanically, it is preferred that polymer (A) ranges from 1 to 30 wt % and, more preferably, from 1 to 20 wt % in the total polymer composition. These ranges apply in particular in case for polymer (A) a wax (2) is used only.

The last requirement according to the present invention is that the multimodal polymer composition additionally comprises a filler (C). Any filler having a positive influence on the water-vapor transmission rate (WVTR) can be used. Preferably, the filler shall be lamellar, such as clay, mica or talc. More preferably, the filler shall be finely divided. The finely divided filler consists of about 95 wt % of particles having particle sizes of less than 10 µm, and about 20-30 wt % of particles having a particle size of less than 1 µm. In the present invention all layer materials may be used as long as they have the ability to disperse in the polymer composition. The filler may either be a clay-based compound or a submicron filler such as talc, calcium carbonate or mica, which usually have been treated, for instance by grinding, to obtain particles of small, i.e. submicron, dimensions, in situ as stated above.

It is preferred that the filler (C) is layered silicate material, still more preferred, filler (C) is a clay-based compound. Clay-based compounds upon compounding of the polymer composition are dispersed in the polymer composition so that individual platelets in the layered structure are separated.

In a further preferred embodiment, the filler (C) is a clay-based layered inorganic, preferably silicate material or material mixture. Such useful clay materials include natural, synthetic and modified phyllosilicates. Natural clays include smectite clays, such as montmorillonite, hectorite, mica, vermiculate, bentonite. Synthetic clays include synthetic mica, synthetic saponite, synthetic hectorite. Modified clays include fluorinated montmorillonite, fluorinated mica.

Of course, the filler (C) may also contain components comprising a mixture of different fillers, such as mixtures of a clay-based filler and talc.

Layered silicates may be made organophylic before being dispersed in the polymer composition by chemical modification, such as by cation-exchange treatment using alkyl ammonium or phosphonium cation complexes. Such cation complexes intercalate between the clay layers.

Preferably, a smectite type clay is used, which comprises montmorinollite, beidellite, nontronite, saponite, as well as hectonite. The most preferred semicite type clay is montmorinollite.

Preferably, also talc is used as a filler (C).

The density affects most physical properties like stiffness impact strength and optical properties of the end products. Hence, and according to the present invention, the density of the polymer composition shall be of 945 kg/m³ or lower. More preferably, the density shall range from 905 to 935 kg/m³, still more preferably from 910 to 930 kg/m³ and most preferably from 915 to 925 kg/m³.

The ranges and values given for the density in the whole invention apply for pure polymer compositions and do not include any additives, in particular no filler (C). The density is determined according to ISO 1183-1987.

Moreover, it is preferred that the polymer composition without any additive, preferably without filler (C) has a melt flow rate $MFR_2$ according to ISO 1133 at 190° C. of 5 to 20 g/10 min, more preferably from 7 to 15 g/10 min.

Preferably, the polymer composition without any additive, preferably without filler (C) has a melt flow rate $MFR_5$ according to ISO 1133 at 190° C. of 20 to 40 g/10 min, more preferably of 25 to 35 g/10 min.

Moreover, it is preferred that the melt flow ratio, which is a ratio of two melt flow rates measured for the same polymer under two different loads, falls within a specific range. The preferred specific range is 2.5 to 4.5, more preferably 2.7 to 4.0, for the melt flow ratio $MFR_5/MFR_2$.

A further characteristic of the molecular weight distribution (MWD) which is the relation between the number of molecules in a polymer and their individual chain length has to be considered. The width of the distribution is a number as a result of the ratio of the weight average molecular weight divided by the number average molecular weight ($M_w/M_n$). In the present invention, it is preferred that the polymer composition without any additive, preferably without filler (C), has a $M_w/M_n$ of preferably 8 to 25 and more preferably from 10 to 20.

Additional additives, e.g. inorganic additives, known as excipients and extrusion aids in the field of coatings and films, are used.

For a better adhesion between the coating and the substrate, it is preferred that the polymer is oxidized. Consequently, it is preferred that the polymer composition contains anti-oxidants and process stabilizers less than 2,000 ppm, more preferably less than 1,000 ppm and most preferably not more than 700 ppm. The anti-oxidants thereby may be selected from those known in the art like those containing hindered phenols, secondary aromatic amines, thio-ethers or other sulfur-containing compounds, phosphites and the like including their mixtures.

It has been found that the polymer composition as described above has a very low water-vapor transmission rate (WVTR). Additionally, the composition has a good adhesion to the substrate, in particular to aluminium, without any need to have an adhesion layer between the substrate and the coating. Further, the tendency of the coated article to curl is significantly reduced for the polymer composition compared to neat polymer. These advantageous effects could only be achieved as the miscibility between the polymer and the filler is much higher for a multimodal or bimodal polymer having a low molecular weight polymer fraction in comparison with a polymer having the same melt index and density.

In one preferable embodiment, the multimodal composition comprises as polymer (A), which is the low molecular weight fraction, a polyolefin (1), more preferably a low density polyethylene (LDPE) or linear low density polyethylene (LLDPE). The polyolefin (B), which is the high molecular weight fraction, is a low density polyethylene (LDPE) or a linear low density polyethylene (LLDPE). Preferably, this composition comprises a further polymer (A) which is a wax (2) as defined above. This composition can be produced in an in situ process or can be blended mechanically. Preferred properties for the polymer (A), in particular the polyolefin (1), the wax (2) and the polyolefin (B) are those as given above. In case this composition comprises two polymers (A), namely a polyolefin (1) and a wax (2), it is preferred that the amount of wax (2) in the total composition without filler (C) is 1 to 30 wt %, more preferably 1 to 20 wt % and most preferably 1 to 10 wt %. In turn, the composition comprises 70 to 99 wt %, more preferably 80 to 99 wt % and most preferably 90 to 99 wt % of LLDPE resulting from polymer (A) and polyolefin (B). In case the composition comprises LDPE, it is preferred that wax (2) is present in the amount of 1 to 30 wt % and LDPE resulting at least from polymer (B) and optionally from polymer (A) and is present in the amount of 70 to 99 wt % in the total composition without filler (C).

In another preferable embodiment, a polymer composition is produced in an in situ process, whereby the sequential step process by utilizing reactors coupled in series as described above is preferred. Preferably polymer (A) is produced in a loop reactor whereas polyolefin (B) is produced in a gas phase reactor in the presence of polymer (A). Thereby, it is preferred that the multimodal polymer is at least a bimodal polymer. More preferably, polymer (A) and polyolefin (B) are both polyolefins. The polymer composition of this embodiment comprises 50 to 99 wt % of a linear low density polyethylene (LLDPE) having a multimodal, more preferably a bimodal molecular weight distribution (MWD) and more preferably 1 to 50 wt % of a filler (C), preferably a plate- or sheet-like filler such as mica or talc as described above.

In the following, when the description refers to LLDPE, it means that a multimodal, preferably bimodal LLDPE is used, which comprises a low molecular weight (LMW) fraction, which is polymer (A) (polyolefin (1)), and a high molecular weight (HMW) fraction, which is polymer (B).

Preferably, the linear low density polyethylene (LLDPE) has a melt index $MFR_2$ from 1.0 to 20 g/10 min, more preferably from 2 to 15 g/10 min and most preferably from 3 to 10 g/10 min. It is preferred that the linear low density polyethylene (LLDPE) is at below 945 and ranges preferably from 905 to 935 kg/m$^3$, more preferably from 910 to 930 kg/m$^3$, most preferably from 915 to 925 kg/m$^3$. If the melt index of the linear low density polyethylene (LLDPE) is lower than 1 g/10 min, a high throughput is not reached. On the other hand, if the melt index $MFR_2$ is higher than 20, the melt strength of the polyethylene suffers.

In addition, it is preferred that the linear low density polyethylene (LLDPE) has a melt flow index $MFR_5$ from 20 to 40 and preferably a melt flow ratio $MFR/MFR_2$ from 2.5 to 4.5, more preferably from 2.7 to 4.0. Furthermore, it is preferred that the linear low density polyethylene (LLDPE) has a weight average molecular weight ($M_w$) from 50,000 to 150,000 g/mol, more preferably from 60,000 to 100,000 g/mol and preferably a ratio of the weight average molecular weight to the number average molecular weight $M_w/M_n$ of 8 to 25, more preferably of 10 to 20.

Moreover, the linear low density polyethylene (LLDPE) contains comonomers selected from the group consisting of $C_3$ alpha-olefin, $C_4$ alpha-olefin, $C_5$ alpha-olefin, $C_6$ alpha-olefin, $C_7$ alpha-olefin, $C_8$ alpha-olefin, $C_9$ alpha-olefin, $C_{10}$ alpha-olefin, $C_{11}$ alpha-olefin, $C_{12}$ alpha-olefin, $C_{13}$ alpha-olefin, $C_{14}$ alpha-olefin, $C_{15}$ alpha-olefin, $C_{16}$ alpha-olefin, $C_{17}$ alpha-olefin, $C_{18}$ alpha-olefin, $C_{19}$ alpha-olefin, $C_{20}$ alpha-olefin. Especially preferred are alpha-olefins selected from the group consisting of propylene, 1-butene, 1-pentene, 4-methyl-1-pentene, 1-hexene, 1-heptene, 1-octene, 1-nonene, 1-decene, 6-methyl-1-heptene, 4-ethyl-1-hexene, 6-ethyl-1-octene and 7-methyl-1-octene. Still more preferred, alpha-olefins are selected from the group consisting of 1-butene, 4-methyl-1-pentene, 1-hexene and 1-octene.

As one requirement of the preferred embodiment is that the polymer composition is a linear low density polyethylene (LLDPE) the content of the comonomer units in the polymer is preferably 0.1 to 1.0 mol %, more preferably 0.15 to 0.5 mol %.

It is preferred that the linear low density polyethylene (LLDPE) without filler (C) comprises 40 to 60 wt %, more preferably 49 to 55 wt % polymer (A) and 60 to 40 wt %, and more preferably 51 to 45 wt % polyolefin (B).

As stated above, it is preferred that the linear low density polyethylene (LLDPE) comprises a LMW fraction, which forms the polymer (A). More preferably, the polymer (A), is a polyolefin (1), most preferably an ethylene copolymer containing alpha-olefins other than ethylene and listed above. Furthermore, it is preferred that the polymer (A) of the linear low density polyethylene (LLDPE) has a weight average molecular weight ($M_w$) of 10,000 to 60,000 g/mol, more preferably from 20,000 to 50,000 g/mol. It is further preferred that polymer (A) of the linear high density polyethylene (LLDPE), has a density of at least 905 to 935 kg/m$^3$, more preferably of at least 910 to 930 kg/m$^3$. In addition, it is preferred that polymer (A) of the linear low density polyethylene (LLDPE) has a melt flow rate $MFR_2$ from 1.0 to 20.0 g/10 min, more preferably from 2.0 to 15.0 g/10 min and most preferred from 3 to 10 g/10 min.

It is preferred that polyolefin (B) as the linear low density polyethylene (LLDPE) is an ethylene copolymer containing one or more alpha-olefins as listed above. Thereby, it is preferred that the amount of comonomer units in polyolefin (B) is from 2.0 to 15.0 mol %, more preferably from 3.0 to 10.0 mol %. In addition, it is preferred that the polyolefin (B) in the linear low density polyethylene (LLDPE) has a weight average molecular weight from 80,000 to 300,000 g/mol, more preferably from 100,000 to 200,000 g/mol.

The filler (C) and other additional components in the linear low density polyethylene (LLDPE), are identically used as listed and described above. It is in particular preferred that additionally to the LLDPE, a wax (2), more preferably a polypropylene wax (2a) or an alkyl-ketene dimer (2b) as defined above is used as an additional polymer (A).

In case two polymers (A) are used, namely polyolefin (1) and wax (2), the amount of wax (2) is 1 to 30 wt %, more preferably 2 to 20 wt % and most preferably 1 to 10 wt % in the total composition without filler (C). In turn, the composition without filler (C) comprises 70 to 99 wt %, more preferably 80 to 88 wt % and most preferably 90 to 99 wt % LLDPE resulting from polymer (A) and polyolefin (B).

The further preferable embodiment of the present invention is a polymer composition whereby polymer (A) and polyolefin (B) are preferably mechanically blended. Thereby it is preferred that polymer (A) is a wax (2), more preferably a polypropylene wax (2a) or an alkyl-ketene dimer wax (2b).

In case of polymer (A), where a polypropylene wax (2a) is used, it is preferred that this wax (2a) has a weight average molecular weight ($M_w$) of 100 to 50,000, more preferably from 100 to 10,000, and most preferably from 5,000 to 6,000. In addition, it is preferred that the z-average molecular weight of the polypropylene wax (2a) ranges from 100 to 60,000 g/mol, and more preferably from 100 to 10,000 g/mol. It is preferred that the polypropylene wax (2a) has a number average molecular weight ($M_n$) of 100 to 2,000 g/mol, more preferably 500 to 3,000 g/mol. The melting temperature in DSC-analysis of the polypropylene wax (2a) is preferably of 95 to 130° C., more preferably 105 to 115° C.

Preferably, the polypropylene wax (2a) is mechanically blended with an ethylene polymer as a polyolefin (B) having an $MFR_2$ of 6.5 to 8.5 g/10 min, more preferably from 7 to 8 g/10 min and a density of 900 to 940 kg/m$^3$, more preferably from 915 to 925 kg/m$^3$. It is in particular preferred that polyolefin (B) is a low density polyethylene (LDPE), or a linear low density polyethylene (LLDPE) as described above.

The mechanically blended polymer including a talc as filler (C) and CaO as a water-absorbent component has preferably a density ranging from 1,000 kg/m$^3$ to 1,300 kg/m$^3$, more preferably of 1,150 to 1,200 kg/m$^3$ and a melt flow rate MFR$_2$ of preferably 8 to 9.5 g/10 min, and more preferably of 8.5 to 9.0 g/10 min.

The other preferred alternative of a mechanical blend of wax (2) with polyolefin (B) is to use an alkyl-ketene dimer (2b) as wax (2). Preferably, this alkyl-ketene dimer (2b) has a weight average molecular weight (M$_w$) of 300 to 400 g/mol, more preferably from 320 to 350 g/mol. Preferably, the z-average molecular weight of the alkyl-ketene dimer (2b) is from 300 to 400 g/mol, more preferably from 360 to 390 g/mol. It is preferred that the alkyl-ketene dimer (2b) has a number average molecular weight (M$_n$) of 200 to 450 g/mol, more preferably from 280 to 300 g/mol. In addition, it is preferred that the alkyl-ketene dimer (2b) has a melting temperature DSC-analysis of 55 to 70° C., more preferably from 60 to 65° C.

For polyolefin (B), the same ethylene polymer is used as defined under the mechanical blend comprising a polypropylene wax (2a).

The density of the mechanically blended polymer composition comprising an alkyl-ketene dimer (2b) as defined above, an ethylene polymer (B) as defined above, a filler (C) and a water-absorbent component has preferably a density of 1,050 to 1,300 kg/m$^3$ and more preferably from 1,150 to 1,250 kg/m$^3$. The melt flow rate MFR$_2$ of this polymer composition is preferably from 12.5 g/10 min to 14.5 g/10 min and more preferably from 13 to 14 g/10 min. It is preferred that for this embodiment for filler (C) talc is employed and for the water absorbent compound CaO.

Furthermore, the present invention comprises a process for producing the multimodal composition as defined above.

A multimodal or at least bimodal, e.g. bimodal or trimodal, polymer may be produced by blending two or more monomodal polymers having differently centered maxima in their molecular weight distributions. The blending may be effected mechanically, e.g. analogously to the mechanical blending principles known in the art. Alternatively, the multimodal or at least bimodal, e.g. bimodal or trimodal, polymer composition may be produced by polymerization using conditions which create a multimodal or at least bimodal, e.g. bimodal or trimodal, polymer composition, i.e. using a catalyst system for mixtures with two or more different catalytic sides, using two or more stage polymerization process with different process conditions in the different stages (i.e. different temperatures, pressures, polymerization media, hydrogen partial pressures, etc.). With the polymer as produced in such a sequential step process, i.e. by utilizing reactors coupled in series, and using different conditions in each reactor, the different polymer fractions produced in the different reactors will each have their own molecular weight distribution which may differ considerably from one another. The molecular weight distribution curve of the resulting final polymer can be regarded as superimposing of the molecular weight distribution curves of the polymer fractions which will accordingly show two or more distinct maxima, or at least the distinctively broadened maxima compared with the curves for individual fractions.

A polymer showing such a molecular weight distribution curve is called multimodal, trimodal or bimodal.

Multimodal polymers can be produced according to several processes, which are described, e.g. in WO 92/12182 and WO 97/22633.

A multimodal polymer is preferably produced in a multi-stage process in a multi-stage reaction sequence, such as described in WO 92/12182. The contents of this document are included herein by reference.

It is known to produce multimodal or at least bimodal, e.g. bimodal or trimodal, polymers, preferably multimodal or bimodal olefin-polymers, such as multimodal or bimodal polyethylenes in two or more reactors connected in series whereby the compounds (A) and (B) can be produced in any order.

According to the present invention, the main polymerization stages are preferably carried out as a combination of a slurry gas/gas-phase polymerization. The slurry polymerization is preferably performed in a so-called loop-reactor.

Optionally, and of more advantage, the main polymerization stages may be pre-ceded by a pre-polymerization in which case up to 20 wt %, preferably 1-10 wt %, more preferably 1-5 wt % of the total amount of polymer composition is produced. At the pre-polymerization point, all of the catalyst is preferably charged into a loop-reactor and a polymerization is performed as a slurry polymerization. Such a polymerization leads to less fine particles being produced in the following reactors and to a more homogeneous product being obtained in the end. Such a pre-polymerization is for instance described in WO 96/18662.

Generally, the technique results in a multimodal or at least bimodal, e.g. bimodal or trimodal, polymer composition thereby a Ziegler-Natta or metallocene catalyst in several successive polymerization reactors is used. For example in the production of a bimodal high-density polyethylene composition, a first ethylene polymer is produced in the first reactor under certain conditions with respect to the hydrogen-gas concentration, temperature, pressure and so forth. After the polymerization the reactor-polymer including the catalyst is separated from the reaction mixture and transferred to a second reactor where further polymerization takes place under other conditions.

The components (A) and (B) can be produced with any suitable catalyst system, preferably a coordination catalyst, such as a Ziegler-Natta catalyst system, preferably a coordination catalyst, such as a Ziegler-Natta catalyst of a transition metal of a group 3-10 of the periodic table (IUPAC), a metallocene, non-metallocene, in a manner known in the art. One example of a preferred Ziegler-Natta catalyst comprises Ti, Mg and Al, such as described in document EP 0 688 794 B1, which is included herewith by reference. It is a high-activity pro-catalyst comprising a particular inorganic support, a curing compound deposited on the support, wherein the curing compound is the same as or different from the titanium compound, whereby the inorganic support is contacted with an alkyl metal chloride which is soluble in a non-polar hydrocarbon solvent, and has the formula $(R_n MeCl_{3-n})_m$, wherein R is a $C_1$ to $C_{20}$ alkyl group, Me is a metal of Group III(13) of the periodic table, n=1 or 2 and m=1 or 2, to give a first reaction product, and the first reaction product is contacted with a compound containing hydrocarbyl and hydrocarbyl oxide linked to magnesium which is soluble in non-polar hydrocarbon solvents, to give a second reaction product, and the second reaction product is contacted with a titanium compound which contains chlorine, having the formula $Cl_x Ti(OR^{IV})_{4-x}$, wherein $R^{IV}$ is a $C_2$ to $C_{20}$ hydrocarbyl group and x=3 or 4, to give the procatalyst. Preferred supports are inorganic oxides, more preferably silicon dioxide or silica. Most preferably silica having an average particle size of 20 μm is used. Even more preferred tri-ethyl aluminium as a cocatalyst is used. Alternatively, a metallocene of group 4 metal can be used.

Preferably, polymer (A), the low molecular weight (LMW) polymer, is produced with addition or no addition of comonomer in a first reactor, and also the polyolefin (B), the high molecular weight (HMW) polymer, is produced with addition or no addition, more preferably with addition, of comonomer in the second reactor.

The resulting end product consists of an intimate mixture of polymers from the two reactors, the different molecular weight distribution occurs of these polymers together forming a molecular weight distribution curve having a broad maximum or two maxima, i.e. the end product is a multimodal or bimodal polymer mixture. Since multimodal and, in particular, bimodal polymers, preferably ethylene polymers and the production thereof belong to the prior art, no detailed description is called for here, but reference is made to the above-mentioned document WO 92/12182. It will be noted that the order of the reaction stages may be reversed.

Preferably, as stated above, the multimodal polymer composition according to the invention is a bimodal or trimodal polymer composition. It is also preferred that this bimodal or trimodal polymer composition has been produced by polymerization as described above under different polymerization conditions in two or more polymerization reactors connected in series.

Furthermore, it is preferred that for the multimodal composition according to this invention a process is used as defined above whereby
 a) polymer (A) and polyolefin (B) are produced together in a multi-stage process comprising a loop reactor and a gas-phase reactor, wherein polymer (A) is generated in at least one loop reactor and the polyolefin (B) is generated in a gas-phase reactor in the presence of the reaction product (A) of the loop reactor, and
 b) filler (C) and the composition comprising polymer (A) and polyolefin (B) are blended together and compounded.

In particular, a multi-stage process is used as described above. Especially, it is preferred that a loop reactor is operated at 75 to 100° C., more preferably in the range of 85 to 100° C. and most preferably in the range of 90 to 98° C. Thereby, the pressure is preferably 58 to 68 bar, more preferably 60 to 65 bar.

Preferably, polymer (A) is prepolymerized in a first loop reactor and then continuously removed to a second loop reactor where the polymer (A) is further polymerized. It is preferred that the temperature in the second loop reactor is 90 to 98° C., more preferably about 95° C. Thereby, the pressure is preferably 58 to 68 bar, more preferably about 60 bar.

In addition, it is preferred that in the second loop reactor, the ethylene concentration is 4 to 10 mol %, more preferably 5 to 8 mol % and most preferably about 6.7 mol %.

The hydrogen to ethylene mol-ratio highly depends on the catalyst used. It must be adjusted to render the desired melt flow rate MFR of the polymer withdrawn from the loop reactor. For the preferred catalyst as described it is preferred that the ratio of hydrogen to ethylene is 100 to 800 mol/kmol and more preferably 300 to 700 mol/kmol, still more preferably 400 to 650 mol/kmol and most preferred about 550 mol/kmol.

The polymer slurry is then preferably removed from the loop reactor by using settling lacks and is then preferably introduced into a flash vessel operating preferably at about 3 bar pressure, where the polymer is separated from most of the fluid phase. The polymer is then preferably transferred into a gas-phase reactor operating preferably at 75 to 95° C., more preferably 80 to 90° C. and most preferably about 85° C., and at preferably 10 to 50 bar, more preferably 15 to 25 bar and most preferably about 20 bar.

Additionally, etheylene comonomers were used and hydrogen as well as nitrogen as an inert gas are preferably introduced into the reactor so that the fractional ethylene in the fluidization gas is preferably 1 to 10 mol %, more preferably 1 to 5 mol % and most preferably about 2.5 mol % and the ratio of hydrogen to ethylene is preferably 100 to 400 mol/kmol, more preferably 150 to 300 mol/kmol and most preferably about 210 mol/kmol.

The comonomer to ethylene ratio has influence on the desired density of the bimodal polymer. Hence, it is preferred that the ratio of comonomer to ethylene is 20 to 150 mol/kmol, more preferably 50 to 100 mol/kmol and most preferably about 80 mol/kmol. Preferably, after the polymer is withdrawn from the gas-phase reactor and then mixed with further additives as anti-oxidants and/or process stabilizers by blending.

The polymer mix of polymer (A) and polyolefin (B) is then blended with filer (C) and with any suitable method known in the art. These methods include compounding in a twin-screw extruder, like a counter-rotating twin-screw extruder or a co-rotating twin-screw extruder and compounding in a single-screw extruder.

In addition, the present invention comprises a new multi-layer material comprising at least
 a) a substrate as a first layer (I) and
 b) a multimodal polymer composition as described above as at least one further layer (II).
Preferably, the multi-layer material consists of
 a) a substrate as a first layer (I) and
 b) a multimodal polymer composition as described above as at least one further layer (II).

It is further preferred that the multi-layer material is a two-layer or three-layer material consisting of a substrate as a first layer and of a polymer composition for the second and third layer, whereby preferably at least the second layer is a polymer composition as defined above. The layers can of course be in any order. Optionally, this multi-layer material comprises adhesion promoters as tetra-isopropyl titanate, tetra-stearyl titanate, tetrakis(2-ethylhexyl)titanate, poly(dibutyltitanate).

Preferably, the substrate is selected from the group consisting of paper, paperboard, aluminium film and plastic film.

Preferably, the multi-layer material comprises as a further layer (III) a low density polyethylene (LDPE). Thereby, it is preferred that the low density polyethylene has a density of 900 to 950 kg/m$^3$, more preferably from 915 to 925 kg/m$^3$. In addition, it is preferred that the melt flow rate MFR$_2$ of the low density polyethylene (LDPE) is of 2.0 to 20.0 g/10 min, more preferably from 3.0 to 10.0 g/10 min.

Preferably, the coating weight of layer (II) comprising the polymer composition according to the present invention ranges from 5 to 60 g/m$^2$ and more preferably from 10 to 45 g/m$^2$. Additionally, it is preferred that the layer (III) comprising a low density polyethylene (LDPE) as described above has a coating weight of 0 to 25, more preferably from 3 to 18 g/m$^2$.

The present invention also comprises a film, preferably a cast film, comprising the multimodal polymer composition as described above, more preferably, the film consists of the multimodal polymer composition of the present invention.

Furthermore, the present invention provides a process for producing a multi-layer material comprising the inventive polymer composition as described above. Thereby, it is preferred that the multimodal polymer composition as described above is applied on a substrate by a film-coating line comprising an unwind, a wind, a chill roll and a coating die. Preferably, the speed of the coating line ranges from 50 to 5000 m/min, more preferably from 100 to 1500 m/min. The coating may be done as any coating line known in the art. It is preferred to employ a coating line with at least two extruders to make it possible to produce multilayered coatings with different polymers. It is also possible to have arrangements to treat the polymer melt exiting the die to improve adhesion, e.g. by ozone treatment, corona treatment or flame treatment.

In addition, the present invention comprises the use of the multimodal polymer composition as defined above for extrusion coating, in particular for extrusion coating producing a multi-layer material as described above.

Furthermore, the present invention relates to the use of the multimodal polymer composition for films, preferably cast films.

In the following the present invention is demonstrated by means of examples.

EXAMPLES

Measurements

WVTR:

Water vapor transmission rate was measured at 90% relative humidity and 38° C. temperature according to the method ASTM E96.

Basis Weight or Coating Weight:

Basis weight (or coating weight) was determined as follows: Five samples were cut off from the extrusion coated paper parallel in the transverse direction of the line. The size of the samples was 10 cm×10 cm. The samples were dried in an oven at 105° C. for one hour. The samples were then weighed and the coating weight was calculated as the difference between the basis weight of the coated structure and the basis weight of the substrate. The result was given as a weight of the plastic per square meter.

Molecular Weight Averages and Molecular Weight Distribution:

Molecular weight averages and molecular weight distribution were determined by ISO 16014, part 2 universal calibration (narrow MWD polystyrene standards (universal alibration) and a set of 2×mixed bed+1×10$^7$ Å Tosohas (JP) columns were used).

Density:

Density was determined according to ISO 1183-1987.

Melt Flow Rate or Melt Index:

Melt flow rate (also referred to as melt index) was determined according to ISO 1133, at 190° C. The load used in the measurement is indicated as a subscript, i.e. MFR$_2$ denotes the MFR measured under 2.16 kg load.

Flow Rate Ratio:

Flow rate ratio is a ratio of two melt flow rates measured for the same polymer under two different loads. The loads are indicated as a subscript, i.e., FRR$_{5/2}$ denotes the ratio of MFR$_5$ to MFR$_2$.

Curling:

Curling was determined by cutting a circular sample having an area of 100 cm$^2$ within two hours after the coating. The sample is then allowed freely to curl at the table for two minutes. The curl is then measured as the difference (in mm) from the table to the curled sheet.

Example 1

A dry blend of pellets was made of 650 kg of the low density polyethylene CA8200 of 300 kg of a talc filler Finntalc MO5SL, manufactured and sold by Mondo Minerals and 50 kg of Clariant PP6100 PP wax. This dry blend was then compounded and pelletized by using the above-mentioned ZSK70 extruder. The melt temperature during the extrusion was 200° C. The composition was then dried at 60° C. for 6 hours to remove the moisture. CA8200 is a low density polyethylene designed for extrusion coating, produced and marketed by Borealis. It is produced by free radical polymerization in a high pressure autoclave process. It has an MFR$_2$ of 7.5 g/10 min and a density of 920 kg/m$^3$. Clariant PP6100 is a low molecular weight propylene polymer having a number average molecular weight of 2,090 g/mol, weight average molecular weight 5,370 g/mol, z-average molecular weight 10,900 g/mol and melting temperature in DSC analysis 109° C. The composition had a density of 1,195.7 kg/m$^3$ and MFR$_2$ of 6.1 g/10 min.

Comparative Example 1

The procedure of Example 1 was repeated, except that the amount of CA8200 was 700 kg and Clariant PP6100 was not used. Moreover, no drying at 60° C. was done.

TABLE 1

Data for compositions containing polyolefin and talc used in cast films.

| Example | Composition | MFR$_2$ g/10 min | Density 920 kg/m$^3$ |
|---|---|---|---|
| Example 1 | LD/PP/talc | NA | NA |
| Comparative Example 1 | LD/—/talc | NA | NA |

Example 2

The composition of Example 1 was used to make a cast film on Collin laboratory scale cast film line, having a single screw extruder with a screw diameter of 30 mm and length to diameter (L/D) ratio of 30. The line speed was about 10 m/s (from 8.9 to 10.3 m/s), the output about 5 kg/h (from 4.91 to 6.07 kg/h), the die temperature 250° C. and melt temperature 245° C. The temperature of the chill roll was about 70° C. (68 to 72° C.). The data can be found in Table 2.

The thickness of the film was 45 µm. The WVTR was 5.0 g/m$^2$/24 h.

Example 3

The procedure of Example 2 was repeated, except that the thickness of the film was 98 µm. The WVTR was 2.3 g/m$^2$/24 h.

Comparative Example 2

The procedure of Example 3 was repeated, except that the composition of Comparative Example 1 was used in place of the composition of Example 1. Data can be found in Table 2.

TABLE 2

Cast film data.

| Example | Composition | Thickness μ/m | WVTR g/m²/24 h |
|---|---|---|---|
| Example 2 | LD/PP/talc | 45 | 5.0 |
| Example 3 | LD/PP/talc | 98 | 2.3 |
| Comparative Example 2 | LD/—/talc | 102 | 2.7 |

The invention claimed is:

1. A multimodal polymer composition comprising
at least one polymer (A) having a weight average molecular weight ($M_w$) of less than 60000 g/mol;
at least one polyolefin (B) having a higher weight average molecular weight ($M_w$) than the polymer (A); and
a filler (C), wherein the polymer composition without the filler has a density of 940 kg/m³ or lower;
and wherein the at least one polymer (A) is a wax having a weight average molecular weight (Mw) of less than 10000 g/mol, and wherein the polymer composition further comprises a polyolefin (1) as a second polymer (A), wherein the polyolefin (1) is a linear low density polyethylene (LLDPE).

2. A polymer composition according to claim 1 wherein the wax is selected from one or more of
(1) a polypropylene wax having weight average molecular weight ($M_w$) of less than 10000 g/mol or a polyethylene wax having weight average molecular weight ($M_w$) of less than 10000 g/mol, or
(2) an alkyl ketene dimer wax having weight average molecular weight ($M_w$) of less than 10000 g/mol.

3. A polymer composition according claim 1 wherein the composition further comprises a polyolefin (1) having a weight average molecular weight ($M_w$) of 10000 to 60000 g/mol as a polymer (A).

4. A polymer composition according to claim 1 wherein the polymer (A) has a density of lower than 945 kg/m³.

5. A polymer composition according to claim 1 wherein the multimodal polymer composition is at least a bimodal polymer composition.

6. A polymer composition according to claim 1 wherein the polyolefin (B) has a weight average molecular weight ($M_w$) of higher than 80000 g/mol.

7. A polymer composition according to claim 1 wherein the polyolefin (B) is a polyethylene.

8. A polymer composition according to claim 1 wherein the polyolefin (B) is a low density polyethylene (LDPE), a linear low density polyethylene (LLDPE) or a linear medium density polyethylene (LMDPE).

9. A polymer composition according to claim 1 wherein the total polymer composition comprises 1 to 50 wt % of the polymer (A), 40 to 90 wt % of the polyolefin (B) and 1 to 50 wt % of the filler (C).

10. A polymer composition according to claim 1 wherein the polymer composition without the filler (C) has melt flow rate MFR$_2$, according to ISO 1133, at 190° C., of 5 to 20 g/10 min.

11. A polymer composition according to claim 1 wherein the polymer composition without the filler (C) has melt flow rate MFR$_5$, according to ISO 1133, at 190° C., of 20 to 40 g/10 min.

12. A polymer composition according to claim 1 wherein the polymer composition without the filler (C) has melt flow ratio MFR$_5$/MFR$_2$ of 2.5 to 4.5.

13. A polymer composition according to claim 1 wherein the polymer composition without the filler (C) has a ratio of the weight average molecular weight ($M_w$) to the number average molecular weight ($M_n$) of from 8 to 25.

14. A polymer composition according to claim 1 wherein 95 wt % of the filler (C) has a particle size of less than 10 μm.

15. A polymer composition according to claim 1 wherein the filler (C) is talc.

16. A polymer composition according to claim 1 wherein the polymer composition further comprises antioxidants(s) and/or process stabilizers in an amount of less than 2000 ppm in the total composition.

17. A polymer composition according to claim 1 wherein the polymer composition is a linear low density polyethylene (LLDPE) or a linear medium density polyethylene (LMDPE), and wherein the polymer (A) and polyolefin (B) are produced in a multi-stage polymerization process.

18. A polymer composition according to claim 17 wherein the amount of comonomer units in the linear low density polyethylene (LLDPE) or the linear medium density polyethylene (LMDPE) is 0.1 to 1.0 mol %.

19. A polymer composition according to claim 17 wherein the comonomer units are selected from the group consisting of $C_3$ α-olefin, $C_4$ α-olefin, $C_5$ α-olefin, $C_6$ α-olefin, $C_7$ α-olefin, $C_8$ α-olefin, $C_9$ α-olefin, $C_{10}$ α-olefin, $C_{11}$ α-olefin, $C_{12}$ α-olefin, $C_{13}$ α-olefin, $C_{14}$ α-olefin, $C_{15}$ α-olefin, $C_{16}$ α-olefin, $C_{17}$ α-olefin, $C_{18}$ α-olefin, $C_{19}$ α-olefin and $C_{20}$ α-olefin.

20. A polymer composition according to claim 1 wherein the polyolefin (B) is a linear low density polyethylene (LLDPE) or low density polyethylene (LDPE).

21. A multi-layer material comprising a substrate as a first layer (I) a multimodal polymer composition according to claim 1 as at least a second layer (II).

22. A multi-layer material according to claim 21 wherein the substrate is selected from the group consisting of paper, paperboard, aluminium film and plastic film.

23. A multi-layer material according to claim 21 wherein the multi-layer material further comprises a third layer (III), which comprises a low density polyethylene (LDPE).

24. A multi-layer material according to claim 23 wherein the low density polyethylene (LDPE) layer (III) has a melt flow rate MFR$_2$, according to ISO 1133, at 190° C., of at least 5 g/10 min.

25. A film comprising a multimodal polymer composition according to claim 1.

26. A process for producing the composition according to claim 1 comprising the steps of
(1) producing the polymer (A) and the polyolefin (B) in a multi-stage process comprising a loop reactor and a gas phase reactor, wherein the polymer (A) is generated in at least one loop reactor and the polyolefin (B) is generated in a gas phase reactor; and
(2) blending and compounding the filler (C) and the composition comprising the polymer (A) and the polyolefin (B).

27. A process for producing the composition according to claim 26 comprising the steps of
(1) producing the composition comprising the polymer (A) and the polyolefin (B) using a catalyst, wherein the catalyst is a high activity procatalyst comprising a particulate inorganic support, and a chlorine compound deposited on the support,
(2) contacting the inorganic support with an alkyl metal chloride which is soluble in non-polar hydrocarbon solvents, and has the formula R$_n$MeCl$_{3-n}$)$_m$ wherein R is a $C_1$-$C_{20}$ alkyl group, Me is a metal of group III(13) of the periodic table, n=1 or 2 and m=1 or 2, to give a first reaction product, (3) contacting the first reaction product with a compound containing hydrocarbyl and hydrocarbyl oxide linked to magnesium which is soluble in non-polar hydrocarbon solvents, to give a second reaction product, and (4) contacting the second reaction product with a titanium compound which contains chlorine, having the formula $Cl_xTi(OR^{IV})_{4-x}$ wherein $R^{IV}$ is a $C_2$-$C_{20}$ hydrocarbyl group and x is 3 or 4, to give the procatalyst, and wherein the titanium compound which contains chlorine may be the same or different than the chlorine compound used in step 1.

28. A process for producing a multi-layer material according to claim 21 wherein the multimodal polymer composition is applied on the substrate by a film coating line comprising an unwind, a wind, a chill roll and a coating die.

29. A method for extrusion coating comprising applying to a material to be coated the multimodal polymer composition according to claim 1.

30. The method according to claim 29 wherein the material to be coated is a multi-layer material comprising a substrate as a first layer (I) and the multimodal polymer composition as at least a second layer (II).

31. A method comprising preparing a film from the multimodal polymer composition according to claim 1.

32. The method of claim 31, wherein the film is a cast film.

33. The polymer composition according to claim 1, wherein the wax is selected from one or more of (1) a polypropylene wax having weight average molecular weight ($M_w$) of less than 10000 g/mol or a polyethylene wax having weight average molecular weight ($M_w$) of less than 10000 g/mol, or (2) an alkyl ketene dimer wax having weight average molecular weight ($M_w$) of less than 10000 g/mol, and wherein the composition further comprises a polyolefin having a weight average molecular weight (Mw) of 10000 to less than 60000 g/mol as a second polymer (A).

34. The polymer composition according to claim 1, wherein the wax is selected from one or more of (1) a polypropylene wax having weight average molecular weight ($M_w$) of less than 10000 g/mol or a polyethylene wax having weight average molecular weight ($M_w$) of less than 10000 g/mol, or (2) an alkyl ketene dimer wax having weight average molecular weight ($M_w$) of less than 10000 g/mol, wherein the composition further comprises a polyolefin having a weight average molecular weight (Mw) of 10000 to less than 60000 g/mol as a second polymer (A), and wherein polyolefin (B) is a low density polyethylene (LDPE), a linear low density polyethylene (LLDPE) or a linear medium density polyethylene (LMDPE).

35. The polymer composition according to claim 1, wherein the wax is selected from one or more of (1) a polypropylene wax having weight average molecular weight ($M_w$) of less than 10000 g/mol or a polyethylene wax having weight average molecular weight ($M_w$) of less than 10000 g/mol, or (2) an alkyl ketene dimer wax having weight average molecular weight ($M_w$) of less than 10000 g/mol, and wherein the comonomer units are selected from the group consisting of $C_3$ α-olefin, $C_4$ α-olefin, $C_5$ α-olefin, $C_6$ α-olefin, $C_7$ α-olefin, $C_8$ α-olefin, $C_9$ α-olefin, $C_{10}$ α-olefin, $C_{11}$ α-olefin, $C_{12}$ α-olefin, $C_{13}$ α-olefin, $C_{14}$ α-olefin, $C_{15}$ α-olefin, $C_{16}$ α-olefin, $C_{17}$ α-olefin, $C_{18}$ α-olefin, $C_{19}$ α-olefin and $C_{20}$ α-olefin.

36. The polymer composition according to claim 1, wherein the composition is a linear low density polyethylene (LLDPE) or a linear medium density polyethylene (LMDPE), wherein the polymer (A) and polyolefin (B) are produced in a multi-stage polymerization process, and wherein the comonomer units are selected from the group consisting of $C_3$ α-olefin, $C_4$ α-olefin, $C_5$ α-olefin, $C_6$ α-olefin, $C_7$ α-olefin, $C_8$ α-olefin, $C_9$ α-olefin, $C_{10}$ α-olefin, $C_{11}$ α-olefin, $C_{12}$ α-olefin, $C_{13}$ α-olefin, $C_{14}$ α-olefin, $C_{15}$ α-olefin, $C_{16}$ α-olefin, $C_{17}$ α-olefin, $C_{18}$ α-olefin, $C_{19}$ α-olefin and $C_{20}$ α-olefin.

37. The polymer composition according to claim 1, wherein the wax is selected from one or more of (1) a polypropylene wax having weight average molecular weight ($M_w$) of less than 10000 g/mol or a polyethylene wax having weight average molecular weight ($M_w$) of less than 10000 g/mol, or (2) an alkyl ketene dimer wax having weight average molecular weight ($M_w$) of less than 10000 g/mol, wherein the composition further comprises a polyolefin having a weight average molecular weight (Mw) of 10000 to less than 60000 g/mol as a second polymer (A), wherein polyolefin (B) is a low density polyethylene (LDPE), a linear low density polyethylene (LLDPE) or a linear medium density polyethylene (LMDPE), and wherein the comonomer units are selected from the group consisting of $C_3$ α-olefin, $C_4$ α-olefin, $C_5$ α-olefin, $C_6$ α-olefin, $C_7$ α-olefin, $C_8$ α-olefin, $C_9$ α-olefin, $C_{10}$ α-olefin, $C_{11}$ α-olefin, $C_{12}$ α-olefin, $C_{13}$ α-olefin, $C_{14}$ α-olefin, $C_{15}$ α-olefin, $C_{16}$ α-olefin, $C_{17}$ α-olefin, $C_{18}$ α-olefin, $C_{19}$ α-olefin and $C_{20}$ α-olefin.

38. The polymer composition according to claim 1, wherein the wax is selected from one or more of (1) a polypropylene wax having weight average molecular weight ($M_w$) of less than 10000 g/mol or a polyethylene wax having weight average molecular weight ($M_w$) of less than 10000 g/mol, or (2) an alkyl ketene dimer wax having weight average molecular weight ($M_w$) of less than 10000 g/mol, wherein the composition further comprises a polyolefin having a weight average molecular weight (Mw) of 10000 to less than 60000 g/mol as a second polymer (A), wherein polyolefin (B) is a low density polyethylene (LDPE), a linear low density polyethylene (LLDPE) or a linear medium density polyethylene (LMDPE), wherein the comonomer units are selected from the group consisting of $C_3$ α-olefin, $C_4$ α-olefin, $C_5$ α-olefin, $C_6$ α-olefin, $C_7$ α-olefin, $C_8$ α-olefin, $C_9$ α-olefin, $C_{10}$ α-olefin, $C_{11}$ α-olefin, $C_{12}$ α-olefin, $C_{13}$ α-olefin, $C_{14}$ α-olefin, $C_{15}$ α-olefin, $C_{16}$ α-olefin, $C_{17}$ α-olefin, $C_{18}$ α-olefin, $C_{19}$ α-olefin and $C_{20}$ α-olefin, and wherein the amount of comonomer units in the linear low density polyethylene (LLDPE) or the linear medium density polyethylene (LMDPE) is 0.1 to 1.0 mol %.

39. The multi-layer material of claim 21, wherein the substrate is selected from the group consisting of paper, paperboard, aluminium film and plastic film, and wherein the multi-layer material further comprises a third layer (III) which comprises a low density polyethylene (LDPE).

40. A film comprising a multimodal polymer composition according to claim 33.

41. A film comprising a multimodal polymer composition according to claim 35.

42. A film comprising a multimodal polymer composition according to claim 38.

* * * * *